United States Patent
Zhu et al.

(10) Patent No.: US 12,399,397 B2
(45) Date of Patent: Aug. 26, 2025

(54) BACKLIGHT MODULE, DISPLAY MODULE AND DISPLAY DEVICE

(71) Applicants: Hefei BOE Ruisheng Technology Co., Ltd., Anhui (CN); BOE TECHNOLOGY GROUP CO., LTD., Beijing (CN)

(72) Inventors: Chengbing Zhu, Beijing (CN); Weifeng Chen, Beijing (CN); Shisong Wu, Beijing (CN); Qilin Liu, Beijing (CN); Xiaopeng Liu, Beijing (CN); Fei Xu, Beijing (CN); Xiaoli Wang, Beijing (CN); Tao Ma, Beijing (CN); Chutian Xia, Beijing (CN)

(73) Assignees: Hefei BOE Ruisheng Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/294,846

(22) PCT Filed: Jul. 29, 2022

(86) PCT No.: PCT/CN2022/109147
§ 371 (c)(1),
(2) Date: Feb. 2, 2024

(87) PCT Pub. No.: WO2024/021079
PCT Pub. Date: Feb. 1, 2024

(65) Prior Publication Data
US 2024/0345436 A1    Oct. 17, 2024

(51) Int. Cl.
*G02F 1/13357*    (2006.01)

(52) U.S. Cl.
CPC .. *G02F 1/133608* (2013.01); *G02F 1/133603* (2013.01)

(58) Field of Classification Search
CPC ...... G02F 1/133603; G02F 1/133314–133608; G09F 9/00
See application file for complete search history.

(56) References Cited

U.S. PATENT DOCUMENTS

2012/0218724 A1    8/2012  Shimizu
2017/0363803 A1*  12/2017  Nakamori ......... G02F 1/133314

FOREIGN PATENT DOCUMENTS

| CN | 208999704 U | 6/2019 |
| CN | 111755586 A | 10/2020 |

(Continued)

OTHER PUBLICATIONS

Office Action dated May 19, 2025, issued in counterpart CN Application No. 202280002460.0, with English translation. (21 pages).

*Primary Examiner* — Jason M Han
(74) *Attorney, Agent, or Firm* — WHDA, LLP

(57) ABSTRACT

A backlight module, a displaying module and a displaying device are provided by the present application. The backlight module includes: a back panel, wherein the back panel includes a bottom panel and a plurality of side panels that are connected to an edge of the bottom panel and are bent toward one side, and the plurality of side panels cooperate with the bottom panel to enclose an assembling space; a light emitting baseboard, wherein the light emitting baseboard is located inside the assembling space and fixed on the bottom panel, the light emitting baseboard includes a substrate fixedly connected to the bottom panel and a light emitting unit located at one side of the substrate away from the bottom panel, the substrate is divided into a functional region and an edge region surrounding the functional region, and the light emitting unit is located within the functional region.

20 Claims, 3 Drawing Sheets

(56) References Cited

FOREIGN PATENT DOCUMENTS

| | | |
|---|---|---|
| CN | 112255841 A | 1/2021 |
| CN | 213877346 U | 8/2021 |
| CN | 113835266 A | 12/2021 |
| CN | 113885255 A | 1/2022 |
| CN | 215867443 U | 2/2022 |

\* cited by examiner

BACKLIGHT MODULE, DISPLAY MODULE AND DISPLAY DEVICE

TECHNICAL FIELD

The present application relates to the technical field of displaying devices and, more particularly, to a backlight module, a displaying module and a displaying device.

BACKGROUND

In the related art, a structure of a backlight module is shown in FIG. 1, wherein a non-light emitting surface of a light emitting baseboard 01 is fixed to a back panel 02, and the periphery of the edge of the light emitting baseboard 01 is fitted to a plastic frame 03. The plastic frame 03 is fabricated by using a pure polycarbonate (PC) injection-molded material, and has a high hardness. The substrate material of the light emitting baseboard may be selected from any one of a thermosetting resin, a FR-4 grade material and polyimide. The plastic frame can play a role in protecting the light emitting baseboard 01, for example, a BT substrate, an FR4 substrate and an FPC substrate, to a certain extent.

Currently, the substrate material of the light emitting baseboards may be fabricated by using quartz or glass, which have the advantages such as a low cost, a low coefficient of thermal expansion ($39*10^{-7}$ m/° C.), a high thermal-shock resistance, no high-temperature deformation in fabrication and usage, and that no warping of the light emitting baseboards is ensured without additional measures and fixture.

However, the inventor has found that, for the light emitting baseboards using glass as the substrate material, if the plastic frame of the pure PC injection-molded material is selected, in the assembling process there is a risk that the plastic frame crushes the glass, and, after the backlight module is assembled, in a mechanical test (shocking, impacting, falling and so on), the light emitting baseboard is also easily crushed after the light emitting baseboard collides with the hard-material plastic frame.

SUMMARY

A backlight module is provided by the present application. The backlight module can effectively protect the substrate of the light emitting baseboard, and effectively prevent the light emitting baseboard from being crushed.

In order to achieve the object stated above, the present application provides the following technical solutions:

A backlight module, wherein the backlight module includes:

a back panel, wherein the back panel includes a bottom panel and a plurality of side panels that are connected to an edge of the bottom panel and are bent toward one side, and the plurality of side panels cooperate with the bottom panel to enclose an assembling space;

a light emitting baseboard, wherein the light emitting baseboard is located inside the assembling space and fixed on the bottom panel, the light emitting baseboard includes a substrate fixedly connected to the bottom panel and a light emitting unit located at one side of the substrate away from the bottom panel, the substrate is divided into a functional region and an edge region surrounding the functional region, and the light emitting unit is located within the functional region; and a plastic frame, wherein the plastic frame is located between the functional region and the plurality of side panels, the plastic frame is divided into a soft-material part and a hard-material part, the soft-material part is disposed oppositely to a surface of the substrate, a material of the soft-material part is a soft material, and a material of the hard-material part is a hard material.

Optionally, the plastic frame has a limiting part and a supporting part, the limiting part is disposed closely to the light emitting baseboard, and the supporting part is located at one side of the limiting part away from the bottom panel, and is for supporting a display panel; and the soft-material part includes at least a part of the limiting part close to the substrate.

Optionally, the limiting part is located between the light emitting baseboard and the side panels, the supporting part is located at one side of the light emitting baseboard away from the bottom panel, and there is a first assembling gap between the light emitting baseboard and the limiting part; and the soft-material part includes at least a part of a region of the limiting part facing a first surface of the substrate close to the substrate, wherein the first surface refers to a surface of the substrate facing the side panels.

Optionally, an orthographic projection of the supporting part on the bottom panel and an orthographic projection of the edge region on the bottom panel overlap;

the soft-material part includes parts of the limiting part and the supporting part that are close to the light emitting baseboard; and the hard-material part includes parts of the limiting part and the supporting part that are away from the light emitting baseboard.

Optionally, a thickness of the soft-material part in the limiting part in a direction from the light emitting baseboard pointing to the side panel is equal to a thickness of the hard-material part in the limiting part in the direction from the light emitting baseboard pointing to the side panel.

Optionally, a thickness of the soft-material part in the supporting part in a direction perpendicular to the bottom panel is equal to a thickness of the hard-material part in the supporting part in the direction perpendicular to the bottom panel.

Optionally, a thickness of the limiting part in a direction from the light emitting baseboard pointing to the side panel is greater than or equal to 1 mm.

Optionally, sides of the plastic frame facing the side panels are fixedly connected to the side panels by clipping-hook structures.

Optionally, an orthographic projection of the supporting part on the bottom panel is located between an orthographic projection of the light emitting baseboard on the bottom panel and orthographic projections of the side panels on the bottom panel, and the soft-material part includes a part of the limiting part close to the bottom panel.

Optionally, a distance from one side of the soft-material part that is opposite to the bottom panel to a first plane is greater than a distance from one side of the substrate that is opposite to the bottom panel to the first plane, wherein the first plane refers to a plane where a surface of the substrate facing the bottom panel is located.

Optionally, the plastic frame is located at one side of the light emitting baseboard away from the bottom panel, an orthographic projection of the plastic frame on the substrate is located within the edge region of the substrate, the limiting part of the plastic frame contacts the light emitting baseboard, and the soft-material part includes a part of the limiting part that contacts the light emitting baseboard.

Optionally, wherein a thickness of the soft-material part in a direction perpendicular to the bottom panel is 0.3 mm to 1 mm.

Optionally, a thickness of the limiting part in a direction from the light emitting baseboard pointing to the side panel is 0.4 mm to 1 mm.

Optionally, sides of the plastic frame facing the side panels are fixedly connected to the side panels by double-sided adhesive tapes.

Optionally, a surface of the limiting part facing the side panels is flush with a surface of the supporting part facing the side panels, and a thickness of the supporting part in a direction from the light emitting baseboard pointing to the side panel is greater than a thickness of the limiting part in the direction from the light emitting baseboard pointing to the side panel.

Optionally, the material of the soft-material part is a thermoplastic-elastomer material, and the material of the hard-material part is a polycarbonate material.

Optionally, the soft-material part and the hard-material part of the plastic frame are integrally formed by injection molding.

Optionally, the backlight module further includes an optical film located at one side of the light emitting baseboard away from the bottom panel, an orthographic projection of the optical film on the substrate is located within the functional region of the substrate, a distance from a surface of the optical film away from the bottom panel to the bottom panel is less than a distance from a surface of the supporting part away from the bottom panel to the bottom panel, and there is a second assembling gap between the optical film and the plastic frame.

Optionally, the backlight module further includes a first light shielding adhesive tape that is adhesively bonded to an edge of the optical film and one side of the supporting part away from the back panel.

A displaying module is further provided by the present application, wherein the displaying module includes the backlight module according to any one of solutions stated above and a display panel, the display panel is located at one side of the supporting part away from the bottom panel, and a border-frame region of the display panel is lapped with the supporting part.

Optionally, the displaying module further includes a second light shielding adhesive tape, and the second light shielding adhesive tape wraps outer sides of the border-frame region of the display panel, the side panels and the bottom panel.

A displaying device is further provided by the present application, wherein the displaying device includes the displaying module according to any one of solutions stated above. A backlight module, a displaying module and a displaying device are provided by the embodiments of the present application. The backlight module includes a back panel, a light emitting baseboard and a plastic frame. The back panel includes a bottom panel and a plurality of side panels that are connected to the edge of the bottom panel and are bent toward one side, and the plurality of side panels cooperate with the bottom panel to enclose an assembling space. The light emitting baseboard is located inside the assembling space and fixed on the bottom panel, and the light emitting baseboard includes a substrate fixedly connected to the bottom panel and a light emitting unit located at the side of the substrate away from the bottom panel. The plastic frame is located between the functional region and the plurality of side panels, and the plastic frame is divided into a soft-material part and a hard-material part. Because the soft-material part of the plastic frame is disposed oppositely to the surface of the substrate, when the plastic frame contacts the light emitting baseboard, the soft-material part of the plastic frame contacts the substrate, and the soft-material part can serve to cushion, which can effectively protect the substrate of the light emitting baseboard, and effectively prevent the light emitting baseboard from being crushed.

REFERENCE NUMBERS

1—back panel; 11—bottom panel; 12—side panels; 2—light emitting baseboard; 21—protecting adhesive; A—functional region; B—edge region; 3—plastic frame; 31—limiting part; 32—supporting part; C—soft-material part; D—hard-material part; 33—enclosing and blocking part; 4—fixing adhesive tape; 41—double-sided adhesive tapes; 5—optical film; 6—first light shielding adhesive tape; 7—display panel; 71—first baseboard; 72—second baseboard; 81—first polarizer; 82—second polarizer; and 9—second light shielding adhesive tape.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
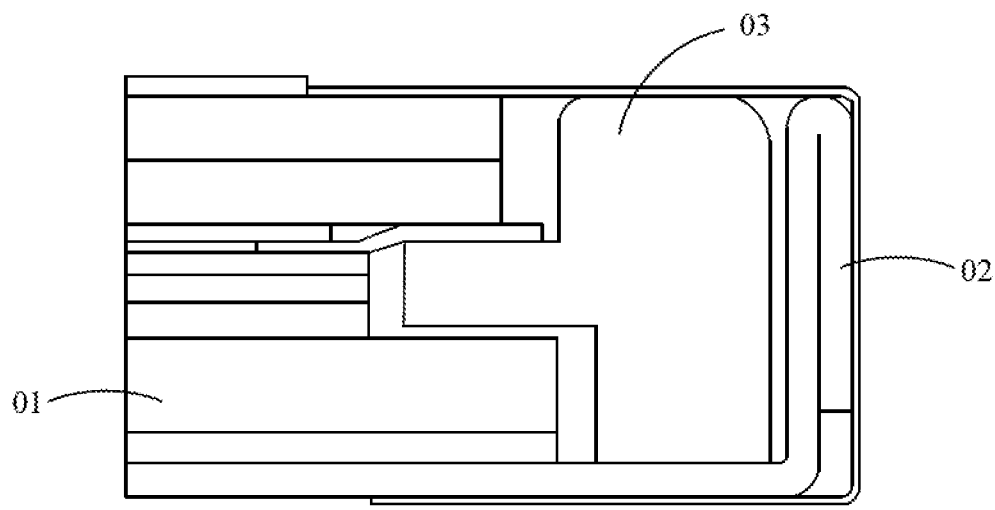
FIG. 1 is a schematic structural diagram of a displaying module in the prior art.
Figure 2:
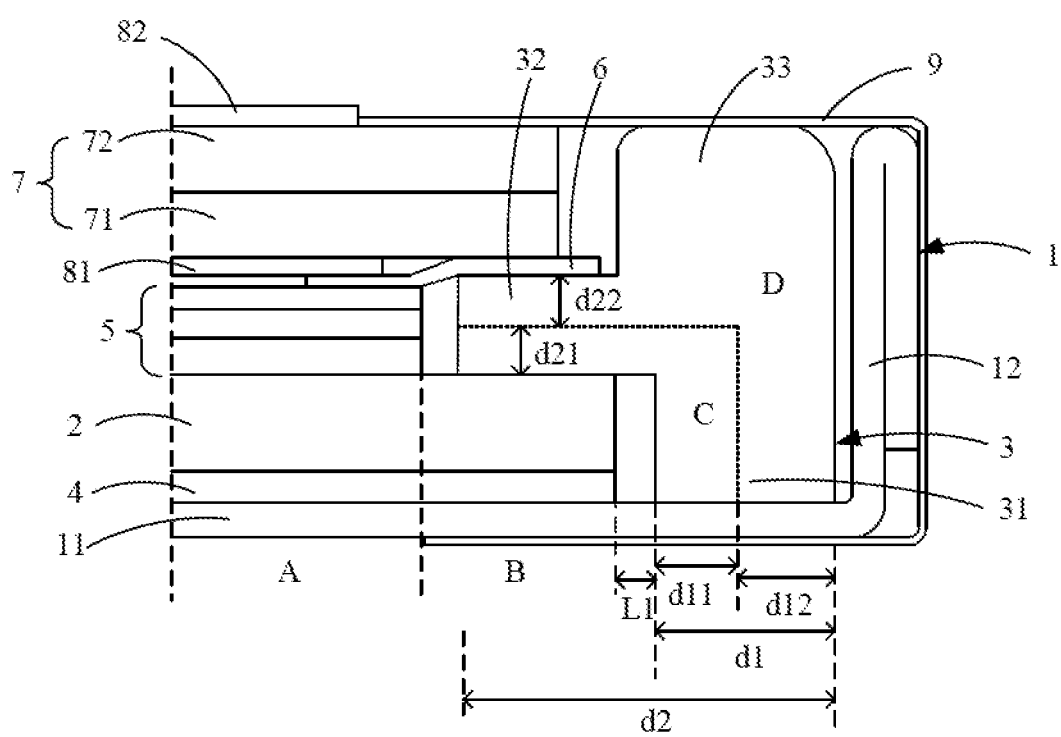
FIG. 2 is a schematic structural diagram of a displaying module according to an embodiment of the present application.
Figure 3:
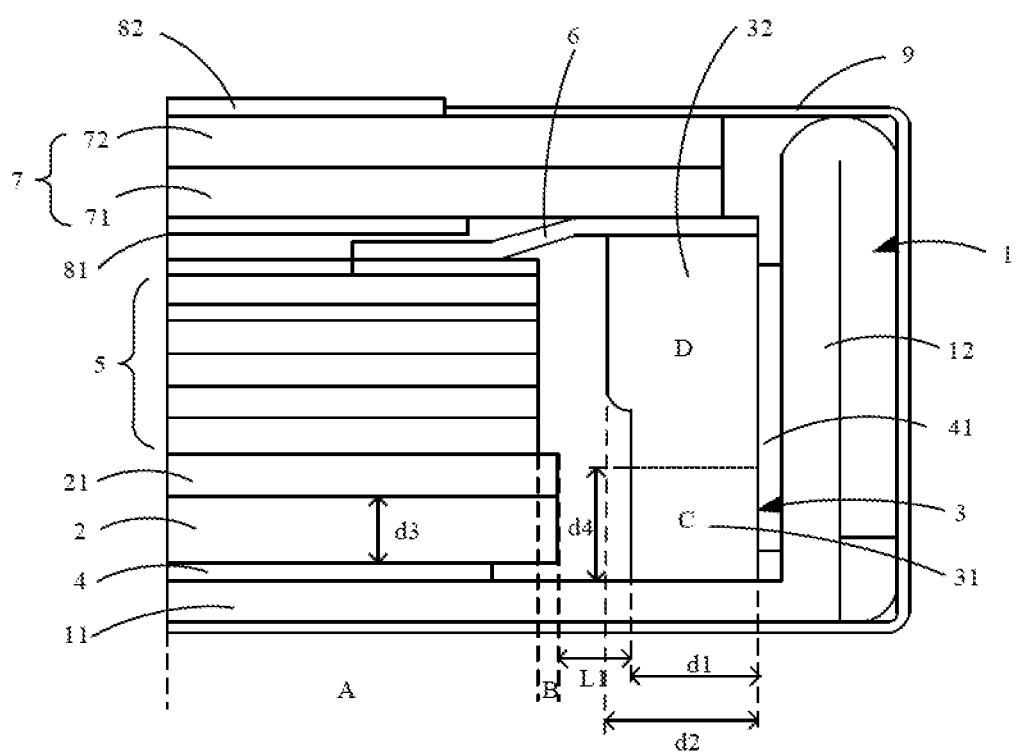
FIG. 3 is a schematic structural diagram of a displaying module according to an embodiment of the present application.
Figure 4:
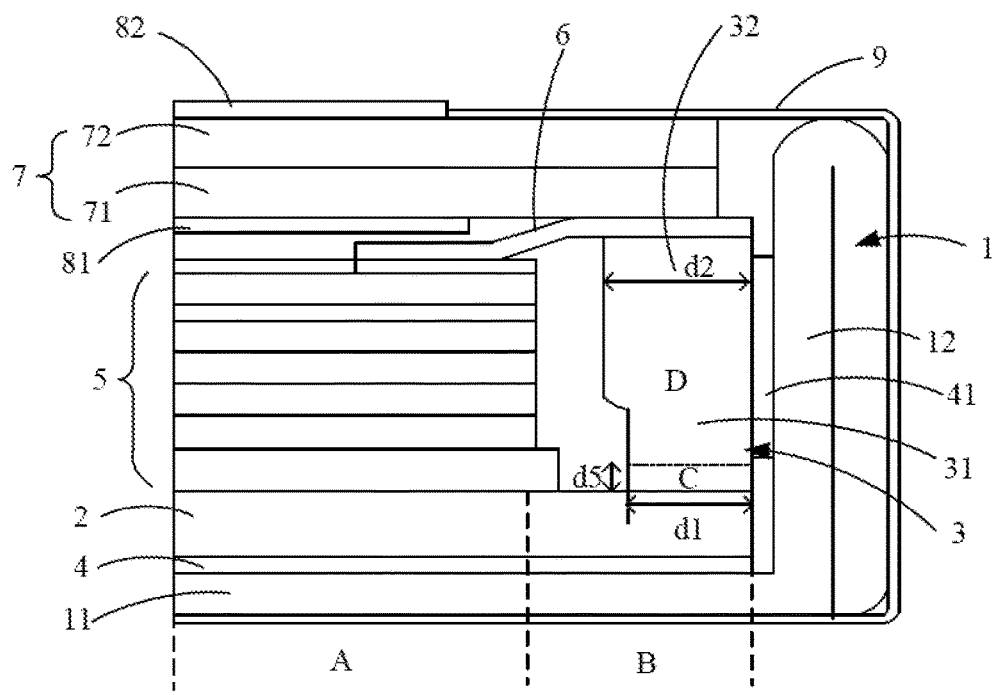
FIG. 4 is a schematic structural diagram of a displaying module according to an embodiment of the present application.

Referring to FIG. 2, FIG. 3 and FIG. 4, a backlight module is provided by the present application, wherein the backlight module includes:

a back panel 1, wherein the back panel 1 includes a bottom panel 11 and a plurality of side panels 12 that are connected to the edge of the bottom panel 11 and are bent toward one side, and the plurality of side panels 12 cooperate with the bottom panel 11 to enclose an assembling space;

a light emitting baseboard 2, wherein the light emitting baseboard 2 is located inside the assembling space and fixed on the bottom panel 11, the light emitting baseboard 2 includes a substrate fixedly connected to the bottom panel 11 and a light emitting unit located at the side of the substrate away from the bottom panel 11, the substrate is divided into a functional region A and an edge region B surrounding the functional region A, and the light emitting unit is located within the functional region A; and a plastic frame 3, wherein the plastic frame 3 is located between the functional region A and the plurality of side panels 12, the plastic frame 3 is divided into a soft-material part C and a hard-material part D, the soft-material part C is disposed oppositely to the surface of the substrate, the material of the soft-material part C is a soft material, and the material of the hard-material part D is a hard material.

The backlight module according to the embodiments of the present application includes a back panel 1, a light emitting baseboard 2 and a plastic frame 3. The back panel 1 includes a bottom panel 11 and a plurality of side panels 12 that are connected to the edge of the bottom panel 11 and are bent toward one side, and the plurality of side panels 12 cooperate with the bottom panel 11 to enclose an assembling space. The light emitting baseboard 2 is located inside the assembling space and fixed on the bottom panel 11, and the light emitting baseboard 2 includes a substrate fixedly connected to the bottom panel 11 and a light emitting unit located at the side of the substrate away from the bottom panel 11. The plastic frame 3 is located between the functional region A and the plurality of side panels 12, and the plastic frame 3 is divided into a soft-material part C and a hard-material part D. Because the soft-material part C of the plastic frame 3 is disposed oppositely to the surface of the substrate, when the plastic frame 3 contacts the light emitting baseboard 2, the soft-material part C of the plastic frame 3 contacts the substrate, and the soft-material part C can serve to cushion, which can effectively protect the substrate of the light emitting baseboard 2, and effectively prevent the light emitting baseboard 2 from being crushed.

Specifically, the material of the substrate stated above is glass. The soft-material part C of the plastic frame 3 is disposed oppositely to the surface of the glass, and can serve to cushion, which can prevent crushing after the light emitting baseboard 2 knocks the plastic frame 3 in a mechanical test (shocking, knocking, falling and so on). It may also be a substrate of another material, which is not limited herein, and is decided according to practical situations. The substrate may be fixed on the bottom panel 11 by a fixing adhesive tape 4.

In an embodiment of the present application, as shown in FIG. 2, FIG. 3 and FIG. 4, the plastic frame 3 may have a limiting part 31 and a supporting part 32, the limiting part 31 is disposed closely to the light emitting baseboard 2, and the supporting part 32 is located at the side of the limiting part 31 away from the bottom panel 11, and is for supporting a display panel 7. The soft-material part C may be disposed at at least the part of the limiting part 31 close to the substrate. When the plastic frame 3 contacts the side face of the substrate, the soft-material part C of the limiting part 31 can cushion, to protect the substrate of the light emitting baseboard 2 from being crushed.

In a specific embodiment, as shown in FIG. 2 and FIG. 3, the limiting part 31 may be located between the light emitting baseboard 2 and the side panels 12, the supporting part 32 is located at the side of the light emitting baseboard 2 away from the bottom panel 11, and there is a first assembling gap L1 between the light emitting baseboard 2 and the limiting part 31, to prevent that the light emitting baseboard 2 and the plastic frame 3 contact too closely and thus interfere each other in the processes of assembling and transportation. The soft-material part C in the plastic frame 3 includes at least the part of the region of the limiting part 31 facing a first surface of the substrate close to the substrate, wherein the first surface refers to a surface of the substrate facing the side panels 12. When the side of the limiting part 31 facing the light emitting baseboard 2 contacts or collides the first surface of the substrate, the soft-material part C of the limiting part 31 close to the substrate can serve to cushion, which can effectively protect the light emitting baseboard 2.

As shown in FIG. 2, the thicknesses d1 of the limiting part 31 in the directions from the light emitting baseboard 2 pointing to the side panels 12 may be greater than or equal to 1 mm. For example, the thicknesses d1 of the limiting part 31 in the directions from the light emitting baseboard 2 pointing to the side panels 12 may be 1 mm to 3 mm, which is not limited herein, and is decided according to practical situations.

In the above embodiment, as shown in FIG. 2, the orthographic projection on the bottom panel 11 of the supporting part 32 located at the side of the light emitting baseboard 2 away from the bottom panel 11 may overlap with the orthographic projection on the bottom panel 11 of the edge region B of the substrate. At this moment, the soft-material part C may include the parts of the limiting part 31 and the supporting part 32 that are close to the light emitting baseboard 2, and the hard-material part D includes the parts of the limiting part 31 and the supporting part 32 that are away from the light emitting baseboard 2. The parts of the limiting part 31 and the supporting part 32 of the plastic frame 3 that are close to the light emitting baseboard 2 can protect the first surface and the surface away from the bottom panel 11 of the substrate, to prevent the substrate from contacting the hard-material part D of the plastic frame 3, to protect the substrate from being crushed.

Because the part of the supporting part 32 close to the substrate is the soft-material part C, and the contacting between the supporting part 32 and the substrate does not result in crushing of the substrate, there may not be a gap disposed between the supporting part 32 and the surface of the substrate away from the bottom panel 11. The surface of the supporting part 32 facing the substrate and the surface of the substrate away from the bottom panel 11 may even be interference-fitted, the plastic frame 3 can be enabled to be more firmly fixed inside the backlight module, the risk that the light emitting baseboard 2 may deviate may be reduced in the mechanical test, and the optical quality of the module is ensured. Furthermore, because there may be not a gap disposed between the supporting part 32 and the substrate, the thickness of the supporting part 32 of the plastic frame 3 in the direction perpendicular to the bottom panel 11 can be increased in the fabrication, the difficulty of the formation of the plastic frame 3 can be reduced.

Specifically, the thicknesses of the soft-material part C in the limiting part 31 in the directions from the light emitting baseboard 2 pointing to the side panels 12 may be equal to the thicknesses of the hard-material part D in the limiting part 31 in the directions from the light emitting baseboard 2 pointing to the side panels 12. The effect of the cushioning of the soft-material part C in the limiting part 31 can be ensured. For example, both of the thicknesses d11 of the soft-material part C in the limiting part 31 in the directions from the light emitting baseboard 2 pointing to the side panels 12 and the thicknesses d12 of the hard-material part D in the directions from the light emitting baseboard 2 pointing to the side panels 12 may be 0.5 mm. Optionally, the thickness of the soft-material part C and the thickness of the hard-material part D in the limiting part 31 may also have another configuration, which is not limited herein, and may be decided according to practical situations. For example, the thicknesses d11 of the soft-material part C in the limiting part 31 in the directions from the light emitting baseboard 2 pointing to the side panels 12 may be 0.5 mm to 1 mm, and the thicknesses d12 of the hard-material part D in the limiting part 31 in the directions from the light emitting baseboard 2 pointing to the side panels 12 may be 0.5 mm to 2 mm.

Specifically, the thickness of the soft-material part C in the supporting part 32 in the direction perpendicular to the bottom panel 11 is equal to the thickness of the hard-material part D in the supporting part 32 in the direction perpendicular to the bottom panel 11. The effect of the cushioning of the soft-material part C in the supporting part 32 can be ensured. For example, both of the thickness d21 of the soft-material part C in the supporting part 32 in the direction perpendicular to the bottom panel 11 and the thickness d22 of the hard-material part D in the direction perpendicular to the bottom panel 11 may be 0.3 mm. Optionally, the thickness of the soft-material part C and the thickness of the hard-material part D in the supporting part 32 may also have another configuration, which is not limited herein, and may be decided according to practical situations. For example, the thickness of the soft-material part C in the supporting part 32 in the direction perpendicular to the bottom panel 11 may be 0.3 mm to 1 mm, and the thickness of the hard-material part D in the supporting part 32 in the direction perpendicular to the light emitting baseboard 2 may be 0.3 mm to 1 mm.

In the above embodiment, as shown in FIG. 2, the plastic frame 3 further includes an enclosing and blocking part 33 located at the side of the supporting part 32 away from the substrate. The enclosing and blocking part 33 is located in the gap between the light emitting baseboard 2 and the side panels 12. The enclosing and blocking part 33 may cooperate with the supporting part 32 to enclose a placing space for the display panel 7. Specifically, the hard-material part D of the plastic frame 3 may include the enclosing and blocking part 33, and the thicknesses of the enclosing and blocking part 33 in the directions from the light emitting baseboard 2 pointing to the side panels 12 may be 2 mm to 5 mm.

In the above embodiment, the sides of the plastic frame 3 facing the side panels 12 are the hard-material part D, and the sides of the plastic frame 3 facing the side panels 12 may be fixedly connected to the side panels 12 by clipping-hook structures, so that the plastic frame 3 is firmly fixed inside the backlight module.

In another embodiment, as shown in FIG. 3 and FIG. 4, in order to realize a narrow border frame, the thickness of the plastic frame 3 is also required to be reduced correspondingly, and, at this moment, the thicknesses d1 of the limiting part 31 in the directions from the light emitting baseboard 2 pointing to the side panels 12 may be 0.4 mm to 1 mm.

As shown in FIG. 3, the whole plastic frame 3 may be disposed between the light emitting baseboard 2 and the side panels 12, and accordingly the orthographic projection of the supporting part 32 of the plastic frame 3 on the bottom panel 11 is located between the orthographic projection of the light emitting baseboard 2 on the bottom panel 11 and the orthographic projections of the side panels 12 on the bottom panel 11. In such a structure, merely the limiting part 31 of the plastic frame 3 is adjacent to the light emitting baseboard 2, and the supporting part 32 is away from the light emitting baseboard 2. Therefore, the soft-material part C may be the part of the limiting part 31 close to the bottom panel 11, the other part of the plastic frame 3 is the hard-material part D, and when the plastic frame 3 and the substrate contact or collide, the soft-material part C in the limiting part 31 contacts the substrate, which can serve to cushion, to prevent the substrate from being crushed.

Specifically, a distance from one side of the soft-material part C away from the bottom panel 11 to a first plane may be greater than a distance from one side of the substrate away from the bottom panel 11 to the first plane, wherein the first plane refers to a plane where a surface of the substrate facing the bottom panel 11 is located. The height of the soft-material part C can be enabled to be greater than the height of the substrate, to prevent the substrate from contacting the hard-material part D of the plastic frame 3.

Specifically, the thickness d3 of the light emitting baseboard 2 may be 0.12 mm to 0.3 mm, and accordingly the thickness d4 of the soft-material part C in the direction perpendicular to the bottom panel 11 may be 0.3 mm to 1 mm, the effect of the cushioning of the soft-material part C is ensured.

In another embodiment, in order to realize a narrow border frame, the plastic frame may also be disposed on the light emitting baseboard 2. Specifically, as shown in FIG. 4, the plastic frame 3 may be located at the side of the light emitting baseboard 2 away from the bottom panel 11, and the orthographic projection of the plastic frame 3 on the substrate is located within the edge region B of the substrate. In other words, the plastic frame 3 may be disposed within the region of the light emitting baseboard 2 that corresponds to the edge region B. The limiting part 31 of the plastic frame 3 contacts the light emitting baseboard 2, and the soft-material part C may include the part of the limiting part 31 that contacts the light emitting baseboard 2. The part of the plastic frame 3 that contacts the light emitting baseboard 2 is the soft-material part C, the hard-material part D is disposed away from the substrate, the substrate can be prevented from being crushed by using the effect of cushioning of the soft-material part C. In such a structure, the edge region of the substrate may be increased. Therefore, the gaps between the light emitting baseboard and the plurality of side panels can be smaller, and the periphery of the light emitting baseboard is pressed firmly by the soft-material part C in the plastic frame, it is not easy to damage, and the risk that the light emitting baseboard may deviate may be reduced in the processes of the assembling and the vibration test, and the optical quality of the module is ensured.

Specifically, the thickness d5 of the soft-material part C in the direction perpendicular to the bottom panel 11 may be 0.3 mm to 1 mm, the effect of the cushioning of the soft-material part C is ensured.

In the above embodiments of the narrow plastic frame, as shown in FIG. 3 and FIG. 4, sides of the plastic frame 3 facing the side panels 12 are fixedly connected to the side panels 12 by double-sided adhesive tapes 41, that the plastic frame 3 is firmly fixed inside the backlight module is realized.

In an embodiment of the present application, as shown in FIG. 2, FIG. 3 and FIG. 4, a surface of the limiting part 31 facing the side panels 12 is flush with a surface of the supporting part 32 facing the side panels 12, and thicknesses d2 of the supporting part 32 in the directions from the light emitting baseboard 2 pointing to the side panels 12 is greater than thicknesses of the limiting part 31 in the directions from the light emitting baseboard 2 pointing to the side panels 12. The supporting strength of the supporting part 32 can be increased, and the thickness of the plastic frame 3 can be increased, the difficulty in the formation of the plastic frame 3 is reduced.

In an embodiment of the present application, the material of the soft-material part C is a thermoplastic-elastomer material (TPE), and the material of the hard-material part D is a polycarbonate material (PC). The soft-material part C and the hard-material part D may also be other materials, which is not limited herein, and is decided according to practical situations.

In an embodiment of the present application, the soft-material part C and the hard-material part D of the plastic frame 3 stated above are integrally formed by injection molding, to be simple in structure, easily fabricated and not easily damaged. Specifically, such a structure may be realized by using an injection molding machine. A first mold uses the hard PC to injection-mold the integral frame, to form the hard-material part D, and then a second mold is used to injection-mold the TPE material onto the corresponding position of the PC frame to form the soft-material part C.

In an embodiment of the present application, as shown in FIG. 2, FIG. 3 and FIG. 4, the backlight module further includes an optical film 5 located at the side of the light emitting baseboard 2 away from the bottom panel 11, an orthographic projection of the optical film 5 on the substrate is located within the functional region A of the substrate, a distance from a surface of the optical film 5 away from the bottom panel 11 to the bottom panel 11 is less than a distance from the surface of the supporting part 32 away from the bottom panel 11 to the bottom panel 11, and there is a second assembling gap between the optical film 5 and the plastic frame 3.

Specifically, the functional region A of the substrate stated above is disposed with a plurality of light emitting units. Each of the light emitting units may be a micro light emitting diode (LED) having a light-emission area of 90000 $\mu m^2$. In order to protect the light emitting units, as shown in FIG. 3, a layer of protecting adhesive 21 may be coated onto the side of the light emitting baseboard away from the bottom panel. Accordingly, the optical film 5 is disposed at the side of the protecting adhesive away from the bottom panel 11.

The optical film 5 may include a plurality of functional film layers, to realize the regulation on the emergent light of the backlight module. Specifically, the optical film layers may include a blue-light brightening film, a quantum-dot film, a light uniformizing film, a lower diffusion film, a lower prism film, an upper prism film, an upper diffusion film, and so on, that are arranged sequentially in layer configuration on the light emitting baseboard 2. The specific structure of the optical film 5 may be selected according to practical situations, and is not limited herein.

In the above embodiment of the present application, as shown in FIG. 2, FIG. 3 and FIG. 4, the backlight module further includes a first light shielding adhesive tape 6 that is adhesively bonded to the edge of the optical film 5 and the side of the supporting part 32 away from the back panel 1, light leakage of the backlight module can be prevented.

Figure 5:
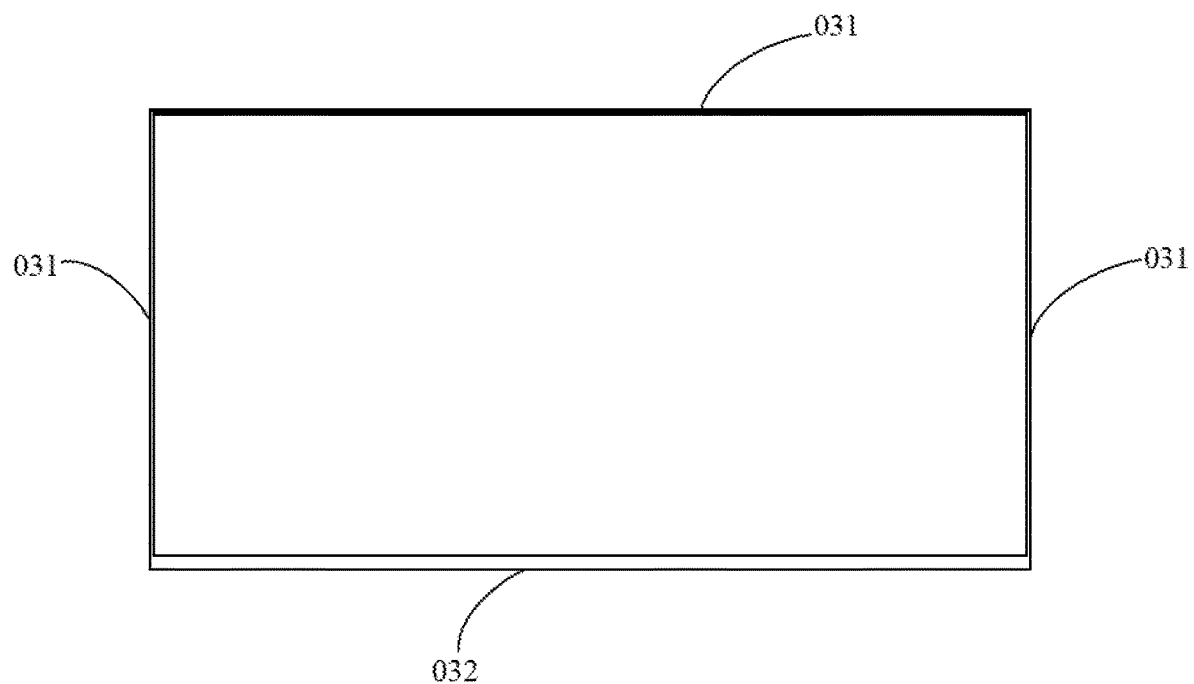
FIG. 5 is a schematic structural diagram of a plastic frame according to an embodiment of the present application.

Specifically, in practical application, the displaying module is rectangular. In order to maximize the screen-to-body ratio, the top-side border frame, the left-side border frame and the right-side border frame of the displaying module are required to be configured as narrow border frames, the bottom-side border frame may not be a narrow border frame, and the widths of the plastic frames in the corresponding backlight module are required to be correspondingly adjusted. In such a case, as shown in FIG. 5, the plastic frame 3 may be formed by three first plastic frames 031 and one second plastic frame 032. Each of the first plastic frames 031 may be a plastic frame whose thicknesses in the directions from the light emitting baseboard pointing to the side panels are less than 1 mm. The structure of the first plastic frame may be the adhesive-frame structure in FIG. 3 and FIG. 4, and the side of the limiting part close to the bottom panel is the soft-material part. The second plastic frame 032 may be a plastic frame whose thicknesses in the directions from the light emitting baseboard pointing to the side panels are greater than 1 mm. The structure of the second plastic frame 032 may be the structure in FIG. 2, and the regions of the limiting part and the supporting part that are close to the light emitting baseboard are the soft-material parts. The three first plastic frames are located at the top-side border frame, the left-side border frame and the right-side border frame of the displaying module, to satisfy the demand on narrow border frames, and the second plastic frame may be located at the bottom-side border frame of the displaying module.

A displaying module is further provided by the present application, wherein the displaying module includes the backlight module according to any one of the above-described technical solutions and a display panel 7, the display panel 7 is located at the side of the supporting part 32 away from the bottom panel 11, and a border-frame region of the display panel 7 is lapped with the supporting part 32. The display panel 7 may include a first baseboard 71 and a second baseboard 72 that face each other, and a liquid-crystal layer between the first baseboard 71 and the second baseboard 72. A first polarizer 81 is disposed at the side of the first baseboard 71 away from the second baseboard 72. A second polarizer 82 is disposed at the side the second baseboard 72 away from the first baseboard 71.

Each of FIG. 2, FIG. 3 and FIG. 4 only shows a quarter of the whole display panel.

The displaying module may further include a second light shielding adhesive tape 9, and the second light shielding adhesive tape 9 wraps the outer sides of the border-frame region of the display panel 7, the side panels 12 and the bottom panel 11, light leakage of the displaying module can be prevented.

A displaying device is further provided by the present application, wherein the displaying device includes the displaying module according to any one of the above-described technical solutions.

Apparently, a person skilled in the art may make various modifications and variations on the embodiments of the present application without departing from the spirit and the scope of the present application. Accordingly, if those modifications and variations on the present application fall within the scope of the claims of the present application and equivalents thereof, then the present application is also intended to encompass those modifications and variations.

The invention claimed is:

1. A backlight module, wherein the backlight module comprises:
   a back panel, wherein the back panel comprises a bottom panel and a plurality of side panels that are connected to an edge of the bottom panel and are bent toward one side, and the plurality of side panels cooperate with the bottom panel to enclose an assembling space;
   a light emitting baseboard, wherein the light emitting baseboard is located inside the assembling space and fixed on the bottom panel, the light emitting baseboard comprises a substrate fixedly connected to the bottom panel and a light emitting unit located at one side of the substrate away from the bottom panel, the substrate is divided into a functional region and an edge region surrounding the functional region, and the light emitting unit is located within the functional region;

a plastic frame, wherein the plastic frame is located between the functional region and the plurality of side panels, the plastic frame is divided into a soft-material part and a hard-material part, the soft-material part is disposed oppositely to a surface of the substrate, a material of the soft-material part is a soft material, and a material of the hard-material part is a hard material; and an optical film located at one side of the light emitting baseboard away from the bottom panel, wherein a distance from a part of the optical film to the bottom panel is equal to a distance from a part of the plastic frame to the bottom panel.

2. The backlight module according to claim 1, wherein the plastic frame has a limiting part and a supporting part, the limiting part is disposed closely to the light emitting baseboard, and the supporting part is located at one side of the limiting part away from the bottom panel, and is for supporting a display panel; and the soft-material part comprises at least a part of the limiting part close to the substrate.

3. The backlight module according to claim 2, wherein the limiting part is located between the light emitting baseboard and the side panels, the supporting part is located at one side of the light emitting baseboard away from the bottom panel, and there is a first assembling gap between the light emitting baseboard and the limiting part; and the soft-material part comprises at least a part of a region of the limiting part facing a first surface of the substrate close to the substrate, wherein the first surface refers to a surface of the substrate facing the side panels.

4. The backlight module according to claim 3, wherein an orthographic projection of the supporting part on the bottom panel is located between an orthographic projection of the light emitting baseboard on the bottom panel and orthographic projections of the side panels on the bottom panel, and the soft-material part comprises a part of the limiting part close to the bottom panel.

5. The backlight module according to claim 4, wherein a distance from one side of the soft-material part away from the bottom panel to a first plane is greater than a distance from one side of the substrate away from the bottom panel to the first plane, wherein the first plane refers to a plane where a surface of the substrate facing the bottom panel is located.

6. The backlight module according to claim 2, wherein the plastic frame is located at one side of the light emitting baseboard away from the bottom panel, an orthographic projection of the plastic frame on the substrate is located within the edge region of the substrate, the limiting part of the plastic frame contacts the light emitting baseboard, and the soft-material part comprises a part of the limiting part that contacts the light emitting baseboard.

7. The backlight module according to claim 6, wherein a thickness of the soft-material part in a direction perpendicular to the bottom panel is 0.3 mm to 1 mm.

8. The backlight module according to claim 4, wherein a thickness of the limiting part in a direction from the light emitting baseboard pointing to the side panel is 0.4 mm to 1 mm.

9. The backlight module according to claim 4, wherein sides of the plastic frame facing the side panels are fixedly connected to the side panels by double-sided adhesive tapes.

10. The backlight module according to claim 2, wherein a surface of the limiting part facing the side panels is flush with a surface of the supporting part facing the side panels, and a thickness of the supporting part in a direction from the light emitting baseboard pointing to the side panel is greater than a thickness of the limiting part in the direction from the light emitting baseboard pointing to the side panel.

11. The backlight module according to claim 1, wherein the material of the soft-material part is a thermoplastic-elastomer material, and the material of the hard-material part is a polycarbonate material.

12. The backlight module according to claim 1, wherein the soft-material part and the hard-material part of the plastic frame are integrally formed by injection molding.

13. The backlight module according to claim 1, wherein an orthographic projection of the optical film on the substrate is located within the functional region of the substrate, a distance from a surface of the optical film away from the bottom panel to the bottom panel is less than a distance from a surface of the supporting part away from the bottom panel to the bottom panel, and there is a second assembling gap between the optical film and the plastic frame.

14. A displaying module, wherein the displaying module comprises the backlight module according to claim 1 and a display panel, the display panel is located at one side of a supporting part away from the bottom panel, and a border-frame region of the display panel is lapped with the supporting part.

15. A displaying device, wherein the displaying device comprises the displaying module according to claim 14.

16. A backlight module, wherein the backlight module comprises:

a back panel, wherein the back panel comprises a bottom panel and a plurality of side panels that are connected to an edge of the bottom panel and are bent toward one side, and the plurality of side panels cooperate with the bottom panel to enclose an assembling space;

a light emitting baseboard, wherein the light emitting baseboard is located inside the assembling space and fixed on the bottom panel, the light emitting baseboard comprises a substrate fixedly connected to the bottom panel and a light emitting unit located at one side of the substrate away from the bottom panel, the substrate is divided into a functional region and an edge region surrounding the functional region, and the light emitting unit is located within the functional region; and a plastic frame, wherein the plastic frame is located between the functional region and the plurality of side panels, the plastic frame is divided into a soft-material part and a hard-material part, the soft-material part is disposed oppositely to a surface of the substrate, a material of the soft-material part is a soft material, and a material of the hard-material part is a hard material, the plastic frame has a limiting part and a supporting part, the limiting part is disposed closely to the light emitting baseboard, and the supporting part is located at one side of the limiting part away from the bottom panel, and is for supporting a display panel, the soft-material part comprises at least a part of the limiting part close to the substrate, the limiting part is located between the light emitting baseboard and the side panels, the supporting part is located at one side of the light emitting baseboard away from the bottom panel, and there is a first assembling gap between the light emitting baseboard and the limiting part, the soft-material part comprises at least a part of a region of the limiting part facing a first surface of the substrate close to the substrate, wherein the first surface refers to a surface of the substrate facing the side panels, an orthographic projection of the supporting part on the bottom panel and an orthographic projection of the edge region on the bottom panel overlap, the soft-material part comprises parts of the limiting part and the supporting part that are close to the light emitting baseboard, and the hard-material part comprises parts of the limiting part and the supporting part that are away from the light emitting baseboard.

17. The backlight module according to claim 16, wherein a thickness of the soft-material part in the limiting part in a direction from the light emitting baseboard pointing to the side panel is equal to a thickness of the hard-material part in the limiting part in the direction from the light emitting baseboard pointing to the side panel.

18. The backlight module according to claim 16, wherein a thickness of the soft-material part in the supporting part in a direction perpendicular to the bottom panel is equal to a thickness of the hard-material part in the supporting part in the direction perpendicular to the bottom panel.

19. The backlight module according to claim 16, wherein a thickness of the limiting part in a direction from the light emitting baseboard pointing to the side panel is greater than or equal to 1 mm.

20. The backlight module according to claim 16, wherein sides of the plastic frame facing the side panels are fixedly connected to the side panels by clipping-hook structures.

* * * * *